United States Patent Office 3,334,430
Patented Aug. 8, 1967

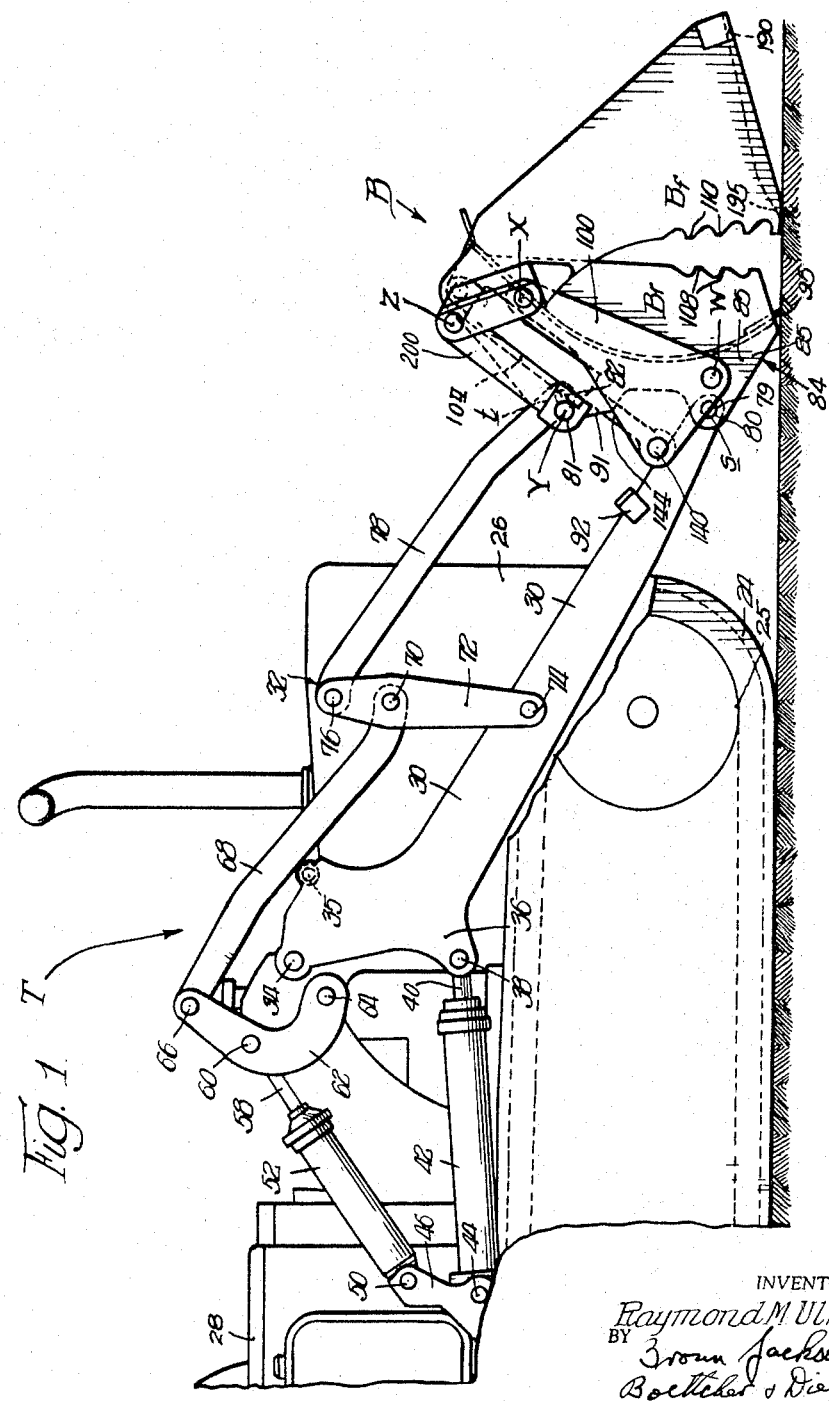

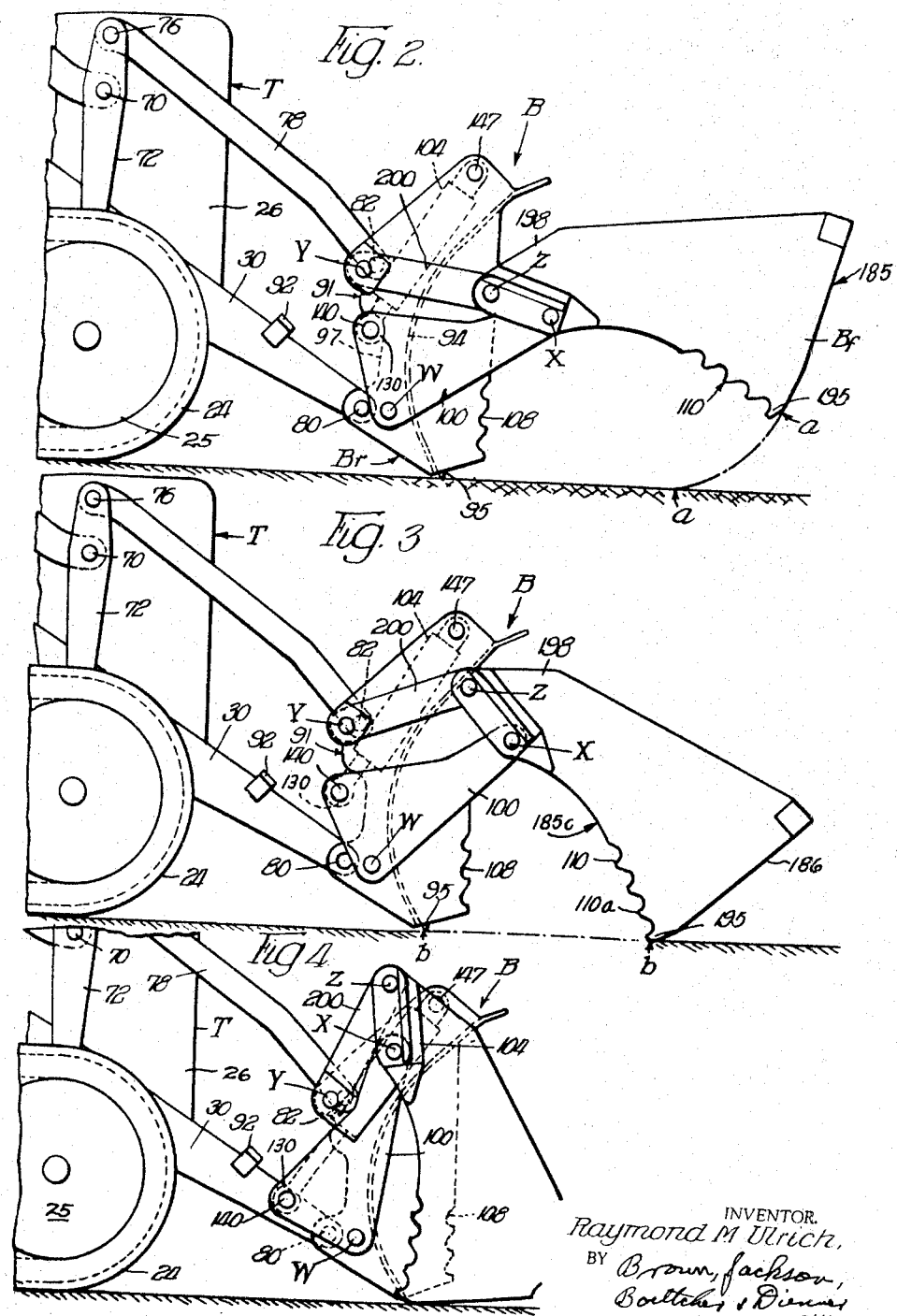

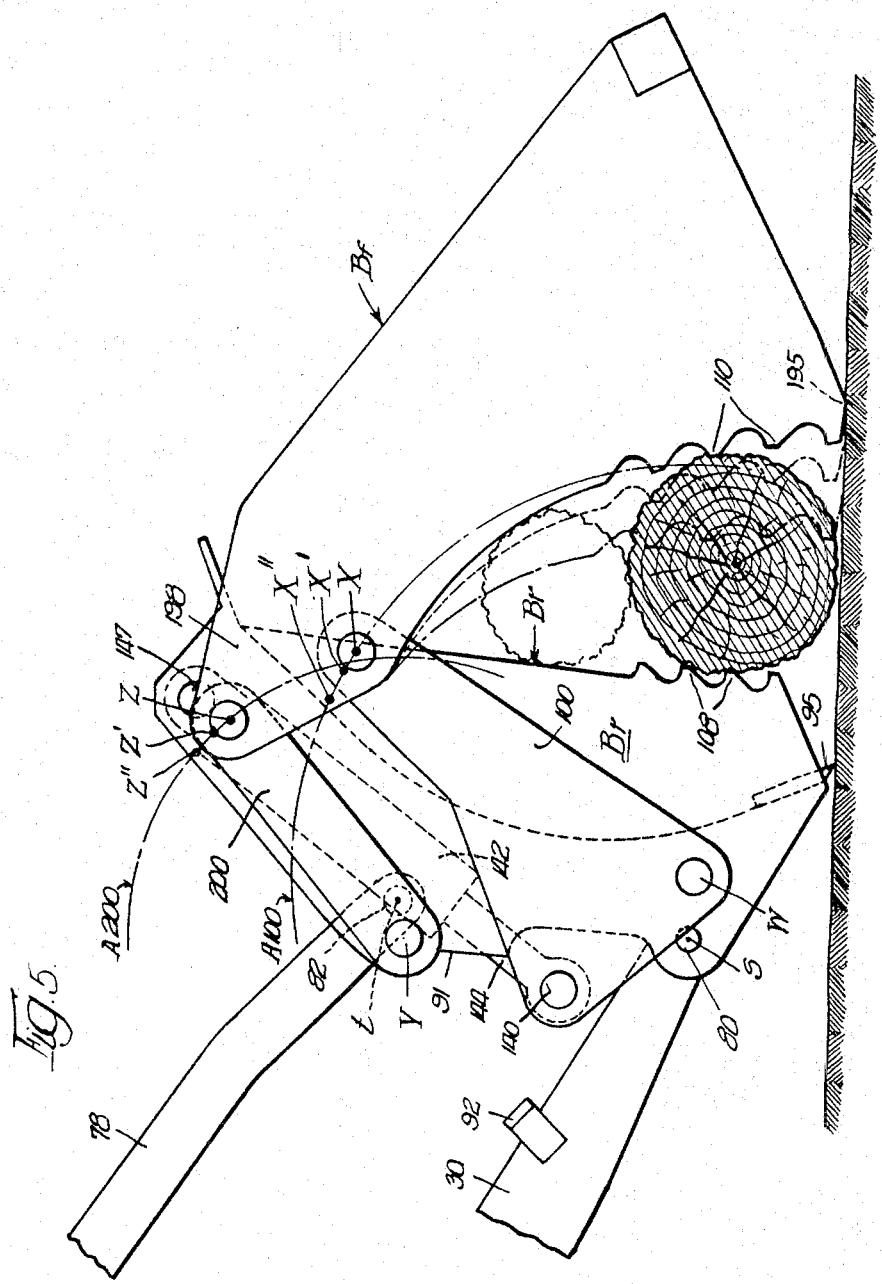

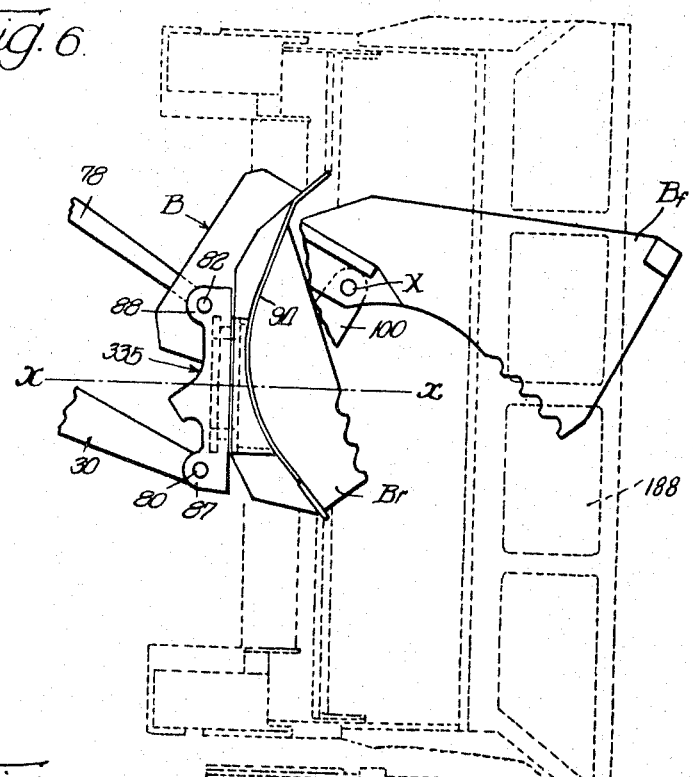
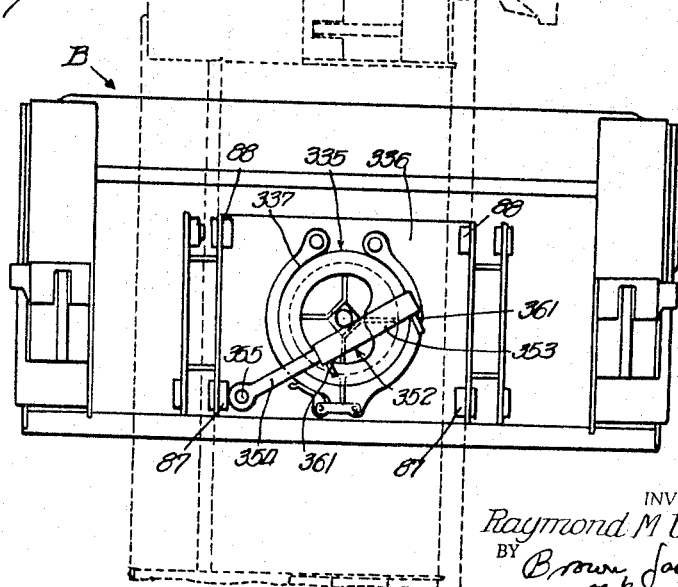

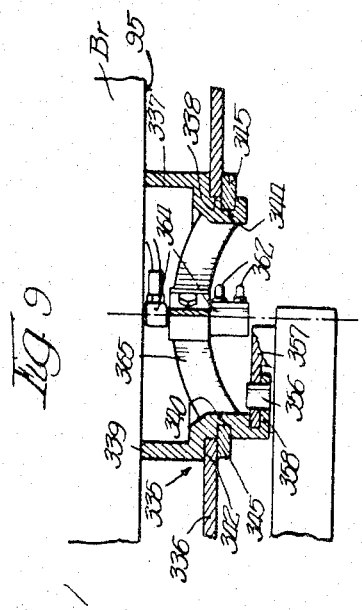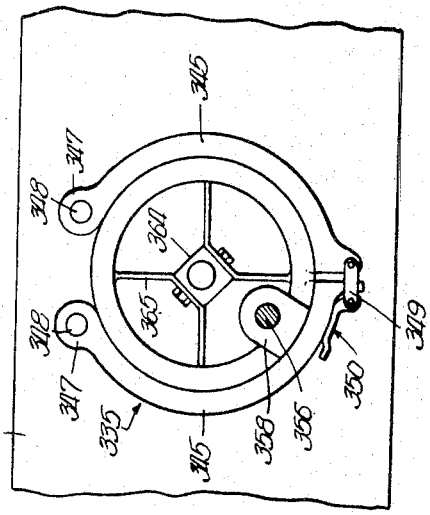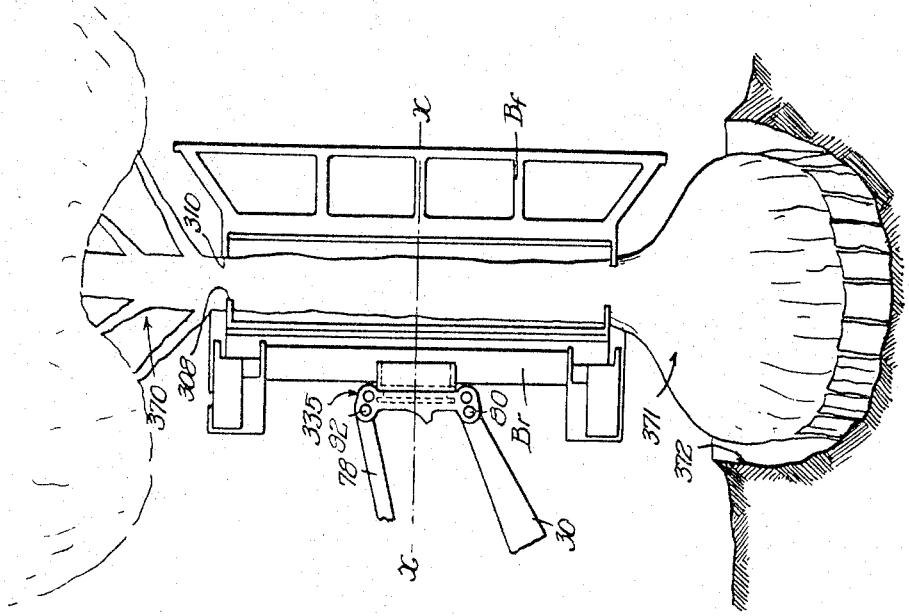

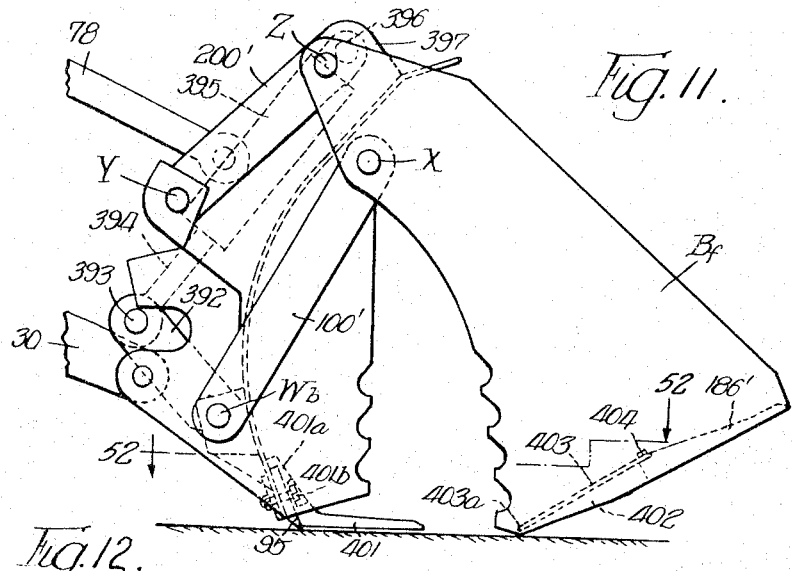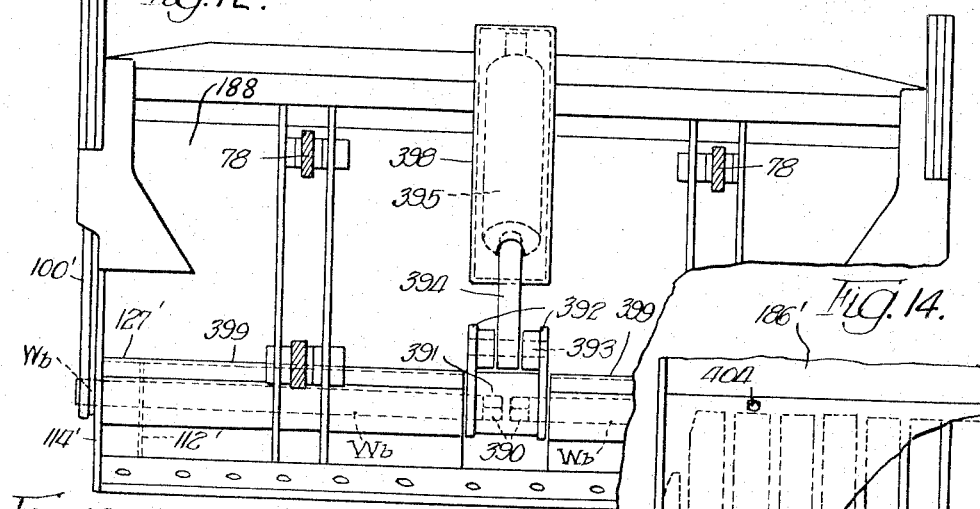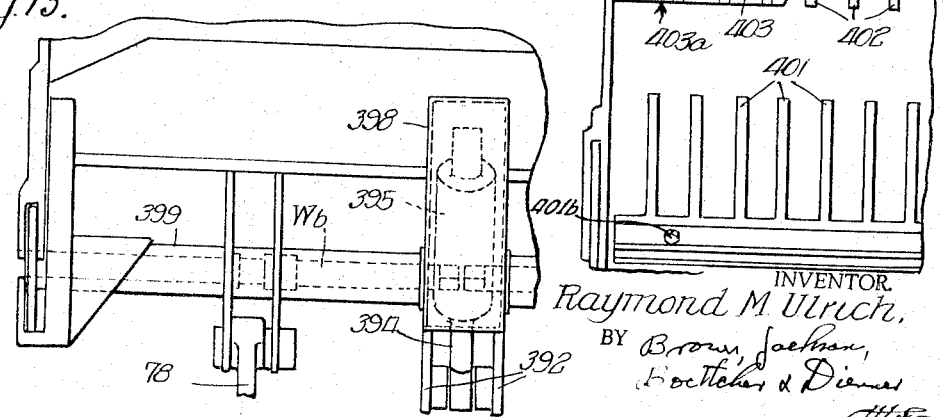

3,334,430
LOAD HANDLING APPARATUS
Raymond M. Ulrich, Roanoke, Ill., assignor to Ulrich Manufacturing Co., Roanoke, Ill., a corporation of Delaware
Original application Feb. 19, 1962, Ser. No. 174,311, now Patent No. 3,243,905, dated Apr. 5, 1966. Divided and this application Apr. 4, 1966, Ser. No. 540,017
7 Claims. (Cl. 37—117.5)

This application is a division of my copending application Ser. No. 174,311, filed Feb. 19, 1962, now Patent No. 3,243,905, and relates to load handling apparatus adapted for mounting on a tractor or other self-propelled vehicle.

As hereinafter described, my load handling apparatus is of the two-section type embodying a front load handling section and a rear load handling section, and one of the principal features of the invention resides in the provision of novel grappling means. Thus a feature of the presently claimed invention is that each of the load handling or bucket sections have a set of long forwardly projecting pick-up teeth mounted on adjacent edges thereof and which teeth are so staggered as to move together in meshing relation when the sections close.

Thus a feature of the invention is that earth handling apparatus may be adapted as a grappling device for picking up tree trunks, logs, railroad ties, pipe, structural steel members, etc. Its improved grappling effect is also advantageous when the apparatus is functioning as a demolition device for pulling down or breaking up old houses, barns, sheds, etc.

Referring now to the accompanying drawings:
FIGURE 1 is a side elevational view showing the basic form of my improved load handling apparatus mounted upon a crawler tread type of tractor;
FIGURES 2, 3 and 4 are fragmentary side elevational viwes, similar to the front part of FIGURE 1, showing the bucket in three successive closing stages of one type of earth moving operation;
FIGURE 5 is a side elevational view showing the front and rear sections in the performance of a grappling operation;
FIGURE 6 is a diagrammatic side view showing the improved load handling apparatus or bucket mounted on a swivel joint permitting angular swiveling thereof;
FIGURE 7 is a rear elevational view of the bucket and this swivel joint mounting;
FIGURE 8 is a rear elevational view of the swivel joint on a larger scale;
FIGURE 9 is a fragmentary sectional view through the swivel joint;
FIGURE 10 is a diagrammatic view showing how the swivel joint enables the apparatus to operate vertically in uprooting a tree or in planting a tree;
FIGURE 11 is a side elevational view of a modified embodiment wherein the bucket operating hydraulic ram means is mounted substantially centrally of the back side of the rear bucket section;
FIGURES 12 and 13 are fragmentary rear elevational and plan views of such embodiment, and FIGURE 14 is a fragmentary sectional view taken on the plane of the line 14—14 of FIGURE 11.

In order to completely explain the full utility and all of the operating advantages of the subject matter disclosed in this application and comprising an invention separate from that claimed in my above-mentioned co-pending application, it will be necessary to briefly describe the basic structure of this co-pending application. For example, a full understanding of the operation and range of adjustments of the projecting pick up teeth shown for example in FIGURES 11–14, it is necessary to understand the basic structures of the two-section load handling unit on which said teeth are mounted.

Referring first to FIGURES 1–5, there is illustrated a two-section bucket, designated B in its entirety, which is shown as being mounted on the front end of a crawler tread type of tractor designated T in its entirety. The tractor shown is of the full crawler type having endless crawler treads 24 traveling over the usual front and rear sprocket wheels and intervening idler rollers associated with the tread frames 25. These treads and tread frames are spaced outwardly from the main frame or body 26 of the tractor to permit the interposition of the bucket lifting arms therebetween. The tractor has the conventional power plant and high pressure hydraulic supply system for energizing the hydraulic controls under the control of the operator seating on the operator's seat 28, all of which is old and well known.

The bucket B is supported at the front end of the tractor T by right and left support arms 30 and by right and left sets of tilting linkage 32, these being disposed on opposite sides of the tractor in the vertical planes of the spaces lying between the tread frames 25 and the tractor body 26. Each of the right and left lifting and lowering arms 30 has fulcrum mounting at its rear end on a transverse pivot pin 34 having fixed axis support on the tractor body or frame 26. Forwardly of the fixed axis fulcrum mounting 34, these two lifting arms 30 are cross connected by a transverse tubular brace bar 35, which compels substantially simultaneous movement of the two lifting arms. Projecting from the underside of each support arm 30 approximately below the fulcrum axis 34 is a clevis-type of pivot lug 36 carrying a transverse pivot pin 38 to which the forward end of a piston rod 40 is pivotally connected. This piston rod extends from a two-way hydraulic ram cylinder 42 which is pivotally mounted at its rear end on a pivot pin 44 extending transversely through a mounting bracket 46 carried by the tractor frame 26. Hydraulic lines connect to the opposite ends of the ram cylinder 42 for enabling the ram cylinder to transmit a two-way lifting and lowering motion to the lifting and lowering support arm 30.

Referring now to the bucket tilting linkage 32, the same bracket 46 which carries the pivot pin 44 of the lifting and lowering ram 42 also carries at a higher level another transverse pivot pin 50 to which the rear end of a bucket tilting ram cylinder 52 is pivotally mounted. This is likewise a two-way cylinder having hydraulic lines connected to opposite ends thereof, and the piston rod 58 extending from the front end of the cylinder is pivotally connected at 60 to the intermediate portion of an angle-shaped lever 62, the lower end of which has fulcrum mounting on a transverse pivot pin 64 carried by the tractor body at a point slightly below and to the rear of the fulcrum pin 34 of the lifting and lowering arm 30. The opposite or upper end of the angle-shaped lever 62 has pivotal connection through a clevis mounted pin 66 with the rear end of a push-pull link 68 which extends forwardly directly above the lifting and lowering arm 30. The front end of the push-pull link 68 has pivotal connection at 70 with an intermediate point of an upwardly extending lever 72 which has its lower end pivotally mounted at 74 on the lifting and lowering arm 30. The upper end of the lever 72 is pivotally connected at 76 with another forwardly extending push-pull link 78. The lever 72 is made up of laterally spaced companion parts welded together at intervals by cross struts, whereby the lower portion of the lever has clevis-like spaced side arms bracing opposite sides of the lifting and lowering arm 30 for receiving the pivot pin 74, and whereby the two push-pull links 68 and 78 have clevis pivotal mounting at 70 and 76 between the spaced halves of the lever.

The pair of right and left supporting arms 30, 30 at each side of the tractor T constitute power-operated supporting means operative to support the bucket B and to raise and lower it; and the pair of right and left sets of linkage 32 constitute power-operated tilting mechanism for tilting the bucket B in its entirely relative to the supporting arms 30, 30. Pivot eyes 79 at the ends of the supporting arms 30, 30 mount transverse pivot pins 80 which establish a lower transverse supporting axis $s$ on which the back bucket section is tiltably mounted for fore and aft swinging movement, which swinging movement is determined by the push-pull action of the tilting links 78. The ends of these latter links 78 also have pivot eyes 81 secured thereto which mount transverse pivot pins 82 that establish a tilting axis $t$ with the back bucket section at a point substantially above the lower supporting axis $s$.

It will be evident from the foregoing that the admission of hydraulic pressure to the rear ends of the bucket lifting cylinders 42 will swing the right and left supporting arms 30 upwardly to raise the bucket to an elevated position, as for transporting a load in the bucket to a point of dumping; and it will also be evident that the admission of hydraulic pressure thereafter to the rear ends of the bucket tilting cylinders 52 will operate through the tilting linkage 32 to tilt the bucket in a forward clockwise direction about the lower supporting axis $s$, as for example to dump the load from the bucket at the point of dumping. During this upward swinging movement of the supporting arms 30, 30 to raise the bucket, the bucket tilting linkage 32 will automatically partake of a certain degree of this upward swinging movement by reason of the pivotal mounting of the intermediate motion-transmitting lever 72 at the pivot 74 on the supporting arm 30, and also by reason of the relatively close proximity of the tilting linkage fulcrum center 64 to the lifting arm fulcrum center 34. This insures that in the operation of raising a loaded bucket to an elevated position, either for transport or for dumping, the bucket will not accidentally be tilted to an angle where part or all of its load might be prematurely dumped accidentally.

The right and left supporting pins 80, 80, and the right and left tilting pins 82, 82 have vertically spaced mounting in right and left hinge brackets 84, 84, each of which bracket is made up of a pair of spaced side plates 85, 85 which have welded attachment to the curved back-surface of the rear bucket section, designated B$r$. The details of these hinge brackets 84 and side plates 85 are fully disclosed in by aforementioned co-pending application. The back wall of the rear bucket section B$r$ is made up of a large curved plate 94 which carries a transverse cutting bit 95 across its lower edge. Also secured to the convexly curved back surface of the rear bucket section B$r$, at points located outwardly beyond the hinge brackets 84, 84 are multipurpose bracket structures 97, 97 welded to the lower corners or lower edge of the back plate 94 along the right and left side edges of such plate. These bracket structures 97 perform the multiple function of: (a) mounting the connecting links 100 and 200 extending between the two bucket sections; (b) mounting on the rear bucket section the hydraulic rams 104 which open and close the bucket; and (c) also mounting on the rear bucket section, along the right and left forward edges thereof, the toothed grappling jaws 108 which co-operate with related grappling jaws 110 extending down along the rearwardly facing side edges of the front bucket section B$f$. Extending transversely through the lower portion of each bracket structure 97 is a pin W which functions as the fulcrum mounting for the lower power operated link 100. Mounted on the fulcrum pin W is a welded assembly in the form of a combined hub and crank structure which establishes the fulcrum mounting of the power operated link 100, and which also establishes the crank pin connection between this power link and the associated hydraulic ram 104.

Extending transversely through the hub-crank structure 130 and through the power link 100 is a crank pin 140 which establishes the power transmitting connection between the associated hydraulic ram 104 and the fulcrum mounting W of the front or lower link 100. Rotatably mounted on an inner portion of each crank pin 140 is the pivot eye at the lower end of the hydraulic ram piston rod 144. The upper end of the ram cylinder 142 has a pivot eye having pivotal mounting on an upper transverse pin 147 supported in the upper corners of the spaced bracket plates making up each bracket 97. More specific details of the bracket structures 84 and 97, and of the hub-crank structures 130 and their connections with the hydraulic rams, etc., are set forth in the aforementioned co-pending application. The front power link or lever 100 has its upper or outer end operatively connected with front bucket section B$f$ through a swinging, mounting pin X.

Referring now to the mounting of each upper guide link 200 on the rear bucket section B$r$, the lower or rear end of such upper guide link 200 has pivotal mounting on a relatively fixed mounting pin Y carried by the rear bucket section at a point above the lower mounting pin W. The lower end of the upper guide link 200 extends into a pocket associated with the bracket structure 97, and the pivot pin Y extends through this pocket and through the lower end of the link 200. The front or outer end of this upped guide link 200 is operatively connected with the front bucket section B$f$ through an upper swinging mounting pin Z carried by the upper bucket section at a point substantially above the lower swinging pivot X. The toothed grappling jaws 108 on the rear bucket section B$r$ have beveled side surfaces adapted to have sliding engagement with the side surfaces with the companion grappling jaws 110 on the front bucket section B$f$, whereby to avoid edge-to-edge abutment of the front and rear grappling jaws as the bucket is moved to closed position. The cutting bit or bits 95 extending transversely of the lower edge of the rear bucket section are removable so that they can be readily replaced or reversed when wear occurs.

Referring now to the construction of the front bucket section B$f$, the principal structural elements thereof comprised two vertical side walls 185, which are joined together across their bottoms by transverse bottom wall 186, all being composed of heavy plate stock. This front bucket section has a completely open front 188 and a completely open back 189 between the vertical side walls 185. Each side wall 185 may be formed with a straight line outer edge and a straight line bottom edge, but the inner or rear gripping edge thereof is preferably formed with a long sweeping curve 185$c$ for mounting the curved inner grappling jaw carried by the front bucket section.

Extending cross-wise along the front or leading edge of the bottom bucket wall 186 is a heavy cutting bit 190, and extending along the rear edge of this bottom bucket wall is another heavy cutting bit 195. The front cutting bit 190 breaks up earth and rocks and picks up such material in a forward motion of the front bucket section when this cutting bit is inclined at a proper cutting angle; and similarly, the rear cutting bit 195 breaks up soil and rocks and picks up such material in a rearward motion of the front bucket section when this rear cutting bit is inclined at a proper cutting angle.

Referring briefly to one of the typical earth moving functions of the bucket, particularly as illustrated in FIGS. 2, 3, and 4, it will be seen that the relative movement between the front and rear bucket sections is comparable to that of a parallel link or quadrangular link system, particularly as the bucket sections approach the bucket closing position. For example, starting with the bucket wide open and fully extended in a forward direction as shown in FIG. 2, preparatory to beginning a back-hoeing, dirt smoothing or like operation, the initial downward movement of the front bucket section B*f* has a slight arcuate component of motion in moving from approximately the position shown in FIG. 2 to approximately the position shown in FIG. 3, this arcuate component being represented by the dotted arc *a—a*. However, it should be pointed out that it is not during this initial range of downward movement of the front bucket that the substantially straight rectilinear line of sweep of the rear cutting bit 195 is desired, but only after the front bucket section has moved into approximately the position shown in FIG. 3, following which the operator can utilize this rectilinear straight line direction of sweep of the bit 195 to produce a finished horizontal surface in the top surface of the soil. This substantially straight rectilinear line of cutting or scraping is represented by the line *b—b* in FIG. 3, which straight line travel *b—b* constitutes approximately two-thirds to three-fourths of the total distance of travel. FIG. 4 shows the completion of the closing movement of the front bucket section B*f* along this rectilinear line of travel *b—b*.

FIGURE 5 illustrates a bucket position somewhat similar to those shown in FIGS. 2 and 3, but on a substantially larger scale, so as to show the bucket performing one of its improved grappling functions to better advantage. Let it first be assumed that the front bucket section B*f* has been dropped down over a collection of logs, railroad ties, pipes or other objects, with this front bucket section B*f* extended outwardly into approximately the position shown in FIG. 2. By now moving the front bucket section rearwardly with its characteristic rearward sweeping motion as shown in FIG. 5, these different objects can be rolled together or piled up in a concentrated collection for subsequent gripping between the front and rear grappling jaws. The long arcuate curvature of the front grappling jaws 110 and the upward and inward slope of the jaw teeth 110*a* along this arcuate curvature, greatly increase the ability of the front bucket section to grasp objects on their outer or far sides and to draw them rearwardly toward the back bucket section.

The improved grappling action of the bucket also enables it to embrace and securely hold a large tree trunk or tree stump extending crosswise of the bucket. It will be noted that the long arcuate curvature of the front grappling jaws 110, the upward slope of the teeth 110*a* therein, and the approach by the front and rear grappling jaws into their rectilinear zone of grappling engagement, afford very effective engagement over large tree trunks, etc. The improved grappling action can also be effectively performed on an object of substantially smaller diameter, where the front and rear grappling jaws can move closer together in a substantially smaller bite. The substantially parallel, rectilinear motion between the front and rear grappling jaws is particularly significant in the case of small bites, where it enables extremely large gripping pressures to be set up between the jaws; and where it also enables a plurality of objects of approximately the same diameter to be gripped in a stacked series between such parallel gripping jaws. This latter portion of the closing motion, where the relative movement is in substantially parallel planes, gives a very powerful vise-like gripping action between the jaws.

FIGURE 5, in addition to showing the effective grappling action between the two bucket sections, also shows the arcs of swing of the two mounting links 100 and 200. The front link 100 has its fulcrum pivot W located in close proximity to the bottom of the rear bucket section B*r*; the rear link 200 has its fulcrum pivot Y located approximately halfway down the vertical height of the rear bucket section; the straight line distance between these two lower fulcrums W and Y being approximately twice the straight line distance between the two upper swinging pivots X and Z on the front bucket section. Preferably, the front link 100 is substantially longer than the rear link 200, as the arc of swing A100 of the front link 100 has a considerably larger radius and is substantially flatter than the arc of swing A200 of the rear link 200, these two arcs intersecting substantially at the point A100–200 between the two limits of swinging movement of the front bucket section. The above proportioning of the lengths of the two mounting links 100 and 200, and location of the four pivot centers W, X, Y and Z, gives the desired wide opening and far-reach of the front bucket section B*f*, and also gives the substantially straight line of sweep *b—b* (FIG. 3), and the substantially parallel closing motion between the grappling jaws 108 and 110. This figure graphically illustrates part of the translatory motion between the two bucket sections by showing three successive positions of the front bucket section B*f* as it moves back toward the rear bucket section B*r*. The first position is shown in full lines, with the upper pivots of the links 100 and 200 in the positions X and Z. The second position is shown in dotted lines, with the upper pivots of the links moved rearwardly along the arcs A100 and A200 into the positions X′ and Z′. The third position is shown in dash-dot lines with the upper pivots moved rearwardly into the positions X″ and Z″. It will be noted that during these successive stages of movement, the rear cutting edge 195 of the front bucket section follows a substantially straight line of travel with respect to the ground. It will be understood, of course, that there may be substantial variations in the lengths of the links 100 and 200, and in the locations of the centers W, X, and Y, without departing from the invention.

In FIGURES 6–10, I have shown the basic construction of my improved bucket supplemented by the further provision of a lateral tilt, swivel joint 335 which is interposed between the bucket B and the front ends of the lifting arms 30 and tilting arms 78. The purpose of this lateral-tilt, swivel joint 335 is to permit the bucket to be tilted to right or left about what may be referred to as a trunnion or fifth-wheel axis *x—x* extending generally fore-and-aft substantially in prolongation of the front ends of the lifting and tilting arms 30, 78. This swivel joint greatly increases the field of utility of the device, such as, for example, by permitting the bucket to work substantially horizontally on its side, as for excavating horizontally under an overhanging ledge or the like; also, it permits the grappling jaws 108 and 110 to open and close with substantially horizontal movements therebetween for grasping either a vertically extending tree trunk, telephone pole, fence post, or the like, whereby to perform the operation of pulling the latter upwardly out of the ground, or to perform the operation of lowering the latter downwardly into a previously prepared hole in the ground. In this swivel joint construction, the bosses 87 which mount in the supporting arm pivot pins 80 and the bosses 88 which mount the tilting arm pivot pins 82 are welded to the four corners of a rectangular plate fixture 336, which constitutes the non-rotating portion of the swivel joint 335. It will be seen that this swivel plate fixture 336 responds to the raising and lowering motions and the tilting motions of the arms 30 and 78. The revolvable portion of the swivel joint consists of a relatively large diameter tubular boss or ring 337 which is welded to the back wall 95 of the rear bucket section B*r*, and which projects rearwardly therefrom through a circular swivel opening 338 in the swivel plate 336. The swivel boss 337 comprises a large diameter front portion 339 and a reduced diameter rear portion 340, the right angle shoulder 342 at the junction of these two portions having a rotative abutment fit against the front surface of the swivel plate 336. Formed in the reduced boss portion 340, on the back side of the swivel plate 336 in an annular locking groove 344 in which engage two locking or retaining segments 345 that overlap the rear face of the swivel plate 336 and retain it in the swivel seat 342. These segments 345 are formed with their inner arcuate surfaces curving upwardly out of the retaining groove 344 and terminating in upper pivot eyes 347 mounted on pivot pins 348 projecting rearwardly from the rear surface of the swivel plate 336. The lower ends of these locking segments 345 are adapted to be releasably locked together by an arrangement of pivoted links 349 and camming hasp 350, the release of which enables the segments to be swung outwardly and upwardly around their upper pivots 348 into releasing positions, enabling the swivel boss 337 to be pulled forwardly through the swivel opening 338 in the swivel plate 336. It will be seen from the foregoing that the entire bucket assembly B consisting of the front and rear bucket sections is revolvable in the swivel joint 335 into laterally inclined or horizontal operating positions, substantially as illustrated in dotted lines in FIGURES 6 and 7.

Such swivelling movements are effected by power means preferably in the form of a hydraulic ram 352 comprising a cylinder 353 and a piston 354, the piston being pivotally connected to the swivel plate 336 by a pivot pin 355, and the cylinder being pivotally connected to the swivel boss 337 by forming a pivot clevis 357 along one side of the cylinder 353, and by forming a pivot tongue or lug 358 projecting radially inwardly at the rear end of the reduced swivel boss portion 340 for entry into the clevis 357. The pivot pin 356 passes through aligned pivot apertures in such clevis 357 and pivot tongue 358. It will be seen from FIGURE 7 that the line of thrust of the hydraulic ram 352 is so related to the arc of swing of the crank pin 356 connecting the cylinder 353 with the swivel boss 337 that the ram is capable of revolving this boss and the bucket through the 90° range ordinarily desired; and, in fact, the ram is capable of revolving the bucket through approximately 120° or more. The hydraulic ram is, of course, double-acting, and it can therefore be made to function as a locking device for locking the bucket in any desired angle of tilt. The two flexible hydraulic hose lines connecting with opposite ends of the ram cylinder are indicated at 361. In addition, two flexible hose lines 362 may extend outwardly through the large circular opening within the tubular swivel boss 337, the front ends of these lines which swivel with the bucket connecting through branch lines leading to the upper and lower ends of the two ram cylinders 142 which open and close the bucket sections; the flexibility of these hydraulic lines 362 passing through the tubular swivel boss 337 being frequently relied upon to accommodate all of the swiveling movements of the bucket. However, if desired, a two-way fluid conducting rotary union 364 may be mounted centrally of the axis of the swivel joint, as upon a spider 365 extending inwardly from the swivel boss 337, to accommodate the relative swivelling movement between the front rotating hose lines and the rear non-rotating hose lines. These two-way rotary fluid conducting unions 364 are well known.

In FIGURES 6–7, the bucket B is illustrated in its normal non-rotated position in full lines, and is illustrated in a swivel or tilted position in dash-dot lines, these two positions being displaced approximately 90° from each other.

In FIGURE 10, I have shown the bucket as having been swiveled or revolved through approximately 90°, with its grappling jaws 108, 110 embracing the vertical trunk of a tree 370. As previously described, by reason of the multiple link mounting and the translatory closing movement of the front bucket section, these two grappling jaws can be made to engage the opposite sides of a tree trunk, telephone pole, fence post, or the like, under extremely high grappling pressures. In FIGURE 10, the root structure 371 of the tree is shown in vertical alignment with a hole 372 in the ground, this figure thereby serving to illustrate either the operation of forcibly uprooting the tree by pulling its root structure upwardly out of the ground, leaving the hole 372; or serving to illustrate the operation of resetting or planting the tree by lowering its root structure 371 down into a previously dug hole 372. Also, as previously referred to, with the bucket tilted to this approximately vertical position shown in FIGURE 10, it can be made to dig soil out from under an overhang or to perform other soil moving operations in what would generally be considered as inoperative or abnormal positions. The mounting of the bucket on the swivel joint 335 also permits either complete side dumping, or a gradual spilling of the bucket load, to one side or the other of the line of travel of the tractor. In performing excavating operations, stripping operations, etc., where it is difficult to swing or steer the tractor sidewise because of cramped quarters, the loaded bucket can be rotated laterally around the axis of the swivel joint 335 for dumping the load over the side edges of the bucket sections, either into a truck disposed to one side, or onto a laterally disposed dumping site. The swivel joint also permits a gradual spilling of the bucket load over the side edge during continued forward travel of the bucket. For example, by providing such swivel mounted bucket with front pusher rollers, the bucket can push a dump truck ahead of it for receiving a load therefrom, following which the bucket can be swiveled to spill or spread to the side at a graduated rate while it is still traveling forwardly, such procedure being advantageous when it is desired to spread a thin bed of black soil along the bottom of a trench preparatory to the laying of metallic pipe therein. The black soil bed minimizing corrosion of the metallic pipe. This side dumping or side spreading is hence a further advantage of the swivel joint mounting of the bucket.

In FIGURES 11–14 I have illustrated a further embodiment wherein the hydraulic ram means for opening and closing the front and rear bucket or material handling sections is mounted on the back side of the rear bucket section, intermediate the sides thereof; and wherein the mounting links at opposite sides of the rear bucket section are cross-connected so that the hydraulic ram means is caused to transmit equalized degrees of operating movement to the front bucket section.

In this embodiment, the power links 100' have their upper ends pivotally connected with the front bucket section in substantially the same manner as the previously described power links 100, but in this modified embodiment the lower ends of these power links are secured fast to transversely connected cross shafts W*b* extending across the back side of the rear bucket section B*r*. The outer ends of these cross shafts are preferably welded to the power links 100', and the shafts extend inwardly therefrom through outer bearing bushings 127' mounted between rearwardly projecting bracket plates 112' and 114' secured to the back side of the curved rear bucket plate. At their inner extremities, these shafts W*b* are formed with aligned square or splinted ends 390 entering the opposite ends of a correspondingly shaped socket formed in a rotatable hub 391. Crank arms 392 extend from the ends of this hub and carry a transverse crank pin 393 at their outer ends. Pivotally mounted on this crank pin 393 is the lower end of a piston rod 394 extending downwardly from a hydraulic ram cylinder 395 of the double-acting type. The ram cylinder has pivotal mounting on the back wall of the rear bucket section B*r*, such as by an upper pivot eye 396 having pivot pin connection with pivot lugs or plates 397 projecting from the back of the rear bucket section. If desired, the hydraulic ram cylinder 395 may have pivotal mounting in the form of pivot pins projecting outwardly from the sides of the cylinder in close proximity to the lower end thereof, these pivot pins extending through the pivot eyes of a pivot stirrup or pair of lugs projecting rearwardly from the rear bucket wall. A protecting type of boxing 398 may be arranged to cover the ram cylinder; also, a protective form of boxing 399 may be extended to cover the transversely extending shafts W*b*, W*b*. These two cross shafts W*b*, W*b* function analogously to the single shaft W*a* shown in FIGURES 4 and 5, insuring the transmission of equalized torques through the two power links 100 or 100' to both sides of the front bucket section B*f*. Thus, both sides of the front bucket section have substantially the same degree of operating pressure applied thereto, thereby avoiding twisting of the front bucket section or the mounting linkage, particularly under abnormal or irregular load conditions. Furthermore, the removal of the two laterally disposed hydraulic rams 104 from the side edges of the bucket assembly and the substitution of the single centrally located hydraulic ram therefor substantially reduces the likelihood of injury to the hydraulic ram apparatus, which may arise because of the laterally disposed hydraulic cylinders striking side walls, etc. An advantage of possibly still more importance is the ability to mount the entire bucket assembly back closer to the tractor, so as to minimize the effect of the forwardly projecting overhanging weight of a loaded bucket on the longitudinal stability of the tractor. By reason of the central location of the crank arms 392, piston rod 394 and ram cylinder 395, etc., these parts of the bucket operating mechanism can be set back between the front wheels of a rubber tire wheel mounted tractor, or between the front ends of the threads of a crawler tread tractor.

In accordance with the present invention the cutting edge of both the rear bucket section and the front bucket section of each said described embodiments is provided with an attachment set of long forwardly projecting teeth or prongs. For convenience, the same have been shown mounted on the embodiment of FIGURE 11–14 which mounting now will be specifically described. Referring therefore to said FIGURES 11–14 an attachment set of long forwardly projecting teeth or prongs is shown at 401 on the rear cutting edge 95 of the rear bucket section Br and at 402 is a second set of long rearwardly projecting teeth or prongs shown mounted on the corresponding facing edge of the front bucket section Bf, the two sets of teeth being staggered or offset so that they can mesh with each other. The forwardly projecting set of teeth 401 extend from a clamp type of cross bar 401a which can be readily mounted and dismounted from the cutting bit bar 95 through clamping bolts 401b or the like. These teeth 401 extend forwardly at an inclined angle from the plane of the bit bar 95 so that when the rear bucket section Br is in substantially the pushing or dozing angle illustrated, the teeth 401 extend substantially parallel to the surface of the ground.

The other set of teeth 402 are preferably cut out of a specially constructed bottom plate 186' in the front bucket section Bf, the ends of these teeth lying approximately in the position previously occupied by the rear cutting edge 195 of the front bucket section. When these rearwardly projecting teeth 402 are not to be used, they can be covered by a cover plate 403 which has its front edge bolted at 404 to the bottom plate 186' of the bucket section; at which time the set of forwardly projecting teeth 401 can also be removed by releasing the bolts 401b and removing the transverse clamping bar 401a from the cutting bit bar 95. The rearwardly projecting edge of the cover plate 403 can be provided with a cutting edge 403a to provide the front bucket section Bf with a rear cutting edge when the teeth 402 are not in use.

The two sets of long teeth 401 and 402 are of advantage for picking up brush, small tree branches, building bricks, and like materials and small objects, in which operations the long teeth will also perform a screening or separating function for separating out loose soil, etc. Such co-operating sets of long teeth 401–402 are also of utility in agricultural situations for picking or digging up beets, potatoes, etc., particularly where it is also desirable to screen out or shake out loose soil.

In similar fashion, the two sets of teeth 401 and 402 may also be mounted and or embodied in the front and rear bucket sections of the embodiments of FIGURES 1–5 and FIGURES 6–10.

While I have illustrated and described what I regard to be the preferred embodiments of my invention, nevertheless, it will be understood that such are merely exemplary and that numerous other modifications and rearrangements may be made therein without departing from the essence of the invention.

I claim:
1. In load handling apparatus adapted to be mounted on a self propelled vehicle, said load handling apparatus comprising, in combination:
  (a) a bucket comprising pivotally connected front and rear bucket sections,
  (b) power operated arm means adapted to be carried by said vehicle and on which arm means the rear bucket section is pivotally mounted for tilting movement about a transverse axis,
  (c) power operated tilting means pivotally connected to said rear bucket section above said transverse axis for tilting said rear bucket section about said axis,
  (d) said front bucket section having a rear transverse edge,
  (e) said rear bucket section having a forward edge and a curved rear wall extending generally in a plane forwardly of its said pivotal connections to the supporting arm means and tilting means,
  (g) a set of long forwardly projecting pick-up teeth mounted on the forward edge of the rear bucket section and extending at an inclined angle to the plane in which the curved back wall of said rear bucket section generally extends, and
  (h) a second set of long rearwardly projecting pick-up teeth mounted on the rear edge of the front bucket section,
  (i) said two sets of pick-up teeth being staggered for moving together in meshing relation with the closing of the front section on the rear section about their pivotal connection.

2. The combination of claim 1 wherein said rear bucket section is swivelly mounted on a mounting plate which in turn is pivotally connected to said lifting and lowering arms and to said tilting means.

3. The combination of claim 2 further including means releasably holding said bucket sections in angular positions to which the rear bucket section is adjustable on said mounting plate.

4. The combination of claim 1 wherein said pick-up teeth are removably mounted on the respective edges of the front and rear bucket sections.

5. The combination of claim 1 further including a cover releasably secured over the pick-up teeth of one of said bucket sections.

6. The combination of claim 1 wherein the front section includes a pair of sides and a bottom wall, said bottom wall having its forward edge shaped to define said second set of rearwardly extending pick-up teeth, said teeth lying substantially wholly between the forward and rear edges of said sides, and a cover releasably secured over said pick-up teeth of the front bucket section and covering said teeth out of the forward edge of the bucket sides.

7. The combination of claim 6 wherein the cover is also provided with a cutting edge disposed rearwardly of said teeth.

References Cited

UNITED STATES PATENTS

| 1,128,399 | 2/1915 | Atkinson | 37—183 X |
| 2,161,147 | 6/1939 | Ehrhardt | 27—184 |
| 2,824,391 | 2/1958 | Roemer | 37—117.5 |
| 2,881,932 | 4/1959 | Schwing | 37—117.5 X |
| 2,924,345 | 2/1960 | Bodin | 37—117.5 X |
| 3,034,237 | 5/1962 | Wolfe et al. | 37—117.5 |

FOREIGN PATENTS 514,976  7/1955  Canada.

ABRAHAM G. STONE, *Primary Examiner.*

R. L. HOLLISTER, *Assistant Examiner.*